(12) United States Patent
Bennett et al.

(10) Patent No.: US 8,830,639 B2
(45) Date of Patent: Sep. 9, 2014

(54) ESD PROTECTION AGAINST CHARGE COUPLING

(75) Inventors: Christopher A. Bennett, Topsham, ME (US); Taeghyun Kang, Scarborough, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 338 days.

(21) Appl. No.: 13/348,949

(22) Filed: Jan. 12, 2012

(65) Prior Publication Data

US 2012/0182663 A1 Jul. 19, 2012

Related U.S. Application Data

(60) Provisional application No. 61/432,743, filed on Jan. 14, 2011.

(51) Int. Cl.
 *H02H 9/00* (2006.01)
 *H02H 9/04* (2006.01)
(52) U.S. Cl.
 CPC .................................. *H02H 9/046* (2013.01)
 USPC ......................................................... 361/56
(58) Field of Classification Search
 USPC .......................................................... 361/56
 See application file for complete search history.

(56) References Cited

U.S. PATENT DOCUMENTS 5,345,356 A * 9/1994 Pianka ............................ 361/56
5,760,606 A 6/1998 Hirano et al.

FOREIGN PATENT DOCUMENTS

| CN | 1870379 A | 11/2006 |
|---|---|---|
| CN | 1914731 A | 2/2007 |
| CN | 101459423 A | 6/2009 |
| CN | 102593805 A | 7/2012 |
| CN | 202651778 U | 1/2013 |
| KR | 1020120082845 A | 7/2012 |

OTHER PUBLICATIONS

"Chinese Application Serial No. 201220018420.9, Notification to Make Rectification mailed Jun. 19, 2012", 2 pgs.
"Chinese Application Serial No. 201210013161.5, Office Action mailed Nov. 21, 2013", 13 pgs.
"Chinese Application Serial No. 201210013161.5, Response filed Apr. 8, 2014 to Office Action mailed Nov. 21, 2013", 13 pgs.

* cited by examiner

*Primary Examiner* — Stephen W Jackson
(74) *Attorney, Agent, or Firm* — Schwegman, Lundberg & Woessner, P.A.

(57) ABSTRACT

This document discusses among other things apparatus and methods for reducing ESD damage to buffer circuits. In an example, an output buffer can include an output, a first transistor configured to couple the output to a high logic supply rail, a second transistor configured to couple the output node to a low logic supply rail, pre-driver logic configured to drive a gate of the first transistor and a gate of the second transistor, and a first resistor configured to reduce electrostatic discharge (ESD) induced current between the first transistor and the pre-driver logic.

20 Claims, 2 Drawing Sheets

ESD PROTECTION AGAINST CHARGE COUPLING

CLAIM OF PRIORITY

This patent application claims the benefit of priority, under 35 U.S.C. Section 119(e), to Bennett, U.S. Provisional Patent Application Ser. No. 61/432,643, entitled "ESD PROTECTION AGAINST CHARGE COUPLING," filed on Jan. 14, 2011, which is hereby incorporated by reference herein in its entirety.

BACKGROUND

Electrostatic discharge (ESD) can be manifest be a sudden and momentary current between conductors at different potentials that, in certain examples, may damage electronic components or materials. Input/output (I/O) buffers (e.g., high current I/O buffers, such as those found in cell phones or other electronic devices having I/O) have been damaged during ESD testing. Failure analysis uncovered that pre-driver circuits, internal to the I/O buffers, were being damaged. Further testing illustrated that large drain/gate capacitance of an output PMOS of the pre-driver circuit can cause coupling of an ESD charge onto the pre-driver.

OVERVIEW

This document discusses among other things apparatus and methods for reducing ESD damage to buffer circuits. In an example, an output buffer can include an output, a first transistor configured to couple the output to a high logic supply rail, a second transistor configured to couple the output node to a low logic supply rail, pre-driver logic configured to drive a gate of the first transistor and a gate of the second transistor, and a first resistor configured to reduce electrostatic discharge (ESD) induced current between the first transistor and the pre-driver logic.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Electrostatic discharge (ESD) is a sudden and momentary current between conductors at different potentials that, in certain examples, may damage electronic components or materials. In an example, input/output (I/O) buffers (e.g., high current I/O buffers, such as those found in cell phones or other electronic devices having I/O) were damaged during ESD testing. Failure analysis uncovered that pre-driver circuits, internal to the I/O buffers, were being damaged. Further testing illustrated that large drain/gate capacitance of an output PMOS of the pre-driver circuit causes coupling of an ESD charge onto the pre-driver. This problem can be worsened in instances when the I/O buffer is an over-voltage tolerant I/O buffer where both of the drain/gate and source/gate capacitance of the output PMOS can contribute to the ESD coupling.

The present inventors have recognized, among other things, a system and method to improve electrostatic discharge (ESD) performance without using a significant silicon area with respect to current systems and method for ESD protection, without sacrificing input/output (I/O) buffer performance. In an example, the power supply and the output of the pre-driver circuit can be current limited to ensure that all paths from the pad to the vulnerable NMOS in the pre-driver are protected from ESD. In an example, the current limiting will not be significant enough to cause depreciative performance in the way of I/O max toggling speed or edge rate.

Figure 1:
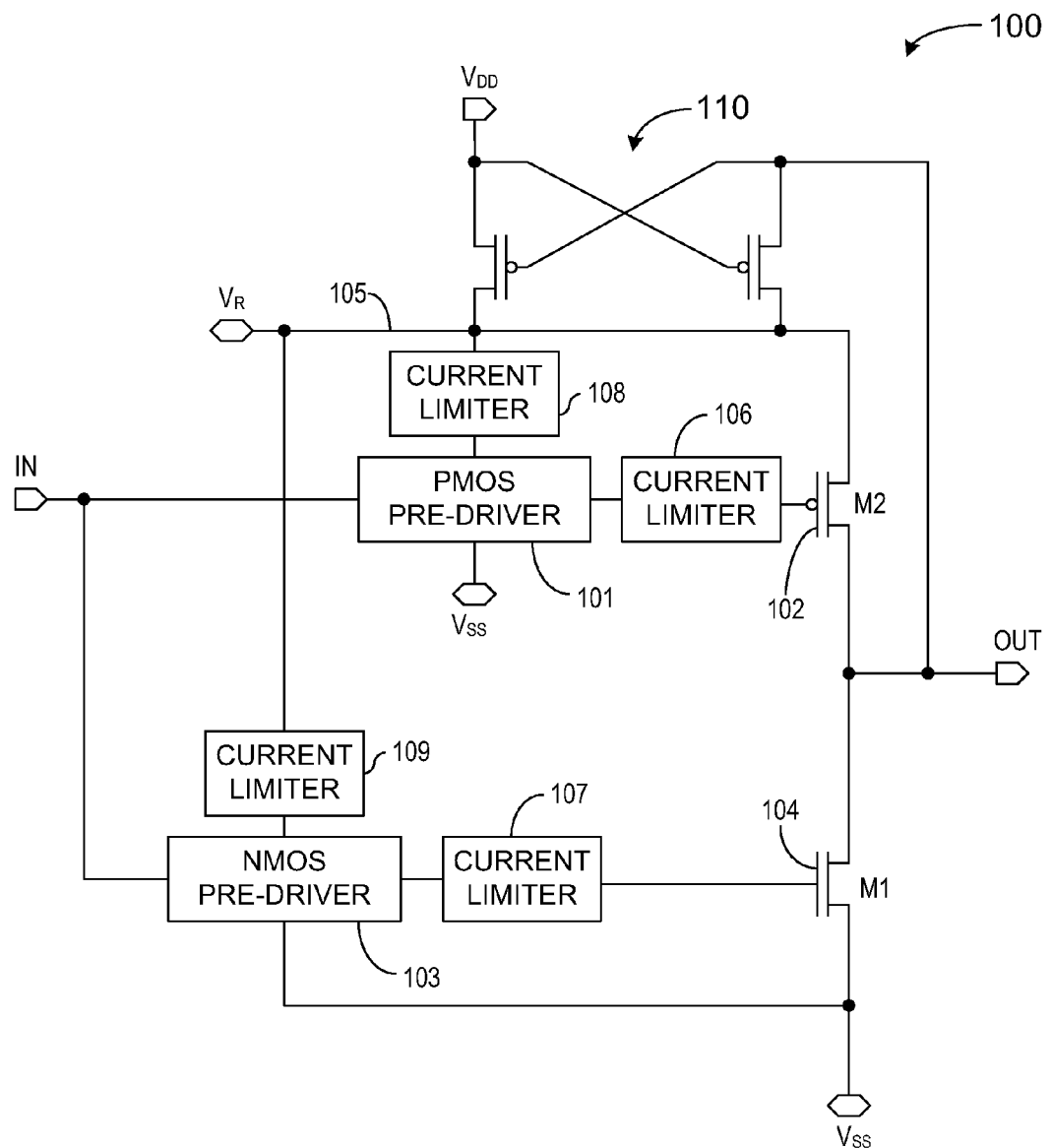
FIG. 1 illustrates generally an example of an I/O buffer circuit configured to provide ESD protection, the circuit including a p-channel metal oxide semiconductor field-effect transistor (PMOS) pre-driver, a PMOS transistor, an n-channel metal oxide semiconductor field-effect transistor (NMOS) pre-driver, and an NMOS transistor.

FIG. 1 illustrates generally an example of an I/O buffer circuit 100 configured to provide ESD protection, the I/O buffer circuit 100 including a PMOS pre-driver 101, a PMOS transistor (M2) 102, an NMOS pre-driver 103, and an NMOS transistor (M1) 104. In an example, during an ESD event, a voltage at the output (OUT) of the I/O buffer circuit can be positive relative to a voltage ($V_R$) of a supply rail 105. Accordingly, a voltage at an output (OUT) of the I/O buffer circuit 100 can be at both a source and a drain of the PMOS transistor (M2) 102. The rate of change of the voltage of the ESD event can multiply the coupling of the source and drain of the PMOS transistor (M2) 102 onto the gate of the PMOS transistor (M2) 102. In certain examples, the gate voltage can be too high for the internal circuits of the PMOS pre-driver 101 and, in a similar manner, for the internal circuits of the NMOS pre-driver 103, thus the internal circuits of the pre-drivers 101, 103 can be can be damaged.

In the example of FIG. 1, the I/O buffer circuit 100 can include one or more current limiters to reduce damaging effects of ESD induced currents. In an example, a first current limiter 106 can be positioned between the output of the PMOS pre-driver and the gate of the PMOS transistor (M2) 102. In certain examples, a second current limiter 107 can be positioned between the output of the NMOS pre-driver 103 and the gate of the NMOS transistor (M1) 104. In some examples, one or more current limiters 108, 109 can be positioned in the path of the power to the PMOS or NMOS pre-drivers 101, 103. In an example, the current limiters 106, 107, 108, 109 can lessen the break-down current induce by the ESD, thereby protecting the PMOS pre-driver 101 or the NMOS pre-driver 104. In other examples, variations of one or more current limiters can be used in different locations in the I/O buffer circuit 100 to limit the break-down current.

In an example, one or more of the current limiters 107, 109 can include a resistor configured to limit current when the NMOS pre-driver 103 goes into snap-back, and can save the silicon from melting. In certain examples, the value of the resistor will not be significant enough to cause depreciative performance in the way of I/O max toggling speed or edge rate.

In certain examples, the I/O buffer circuit 100 can include a voltage translator 110 to apply the higher of a supply voltage (VDD) or a voltage at the output (OUT) to the supply rail 105

Figure 2:
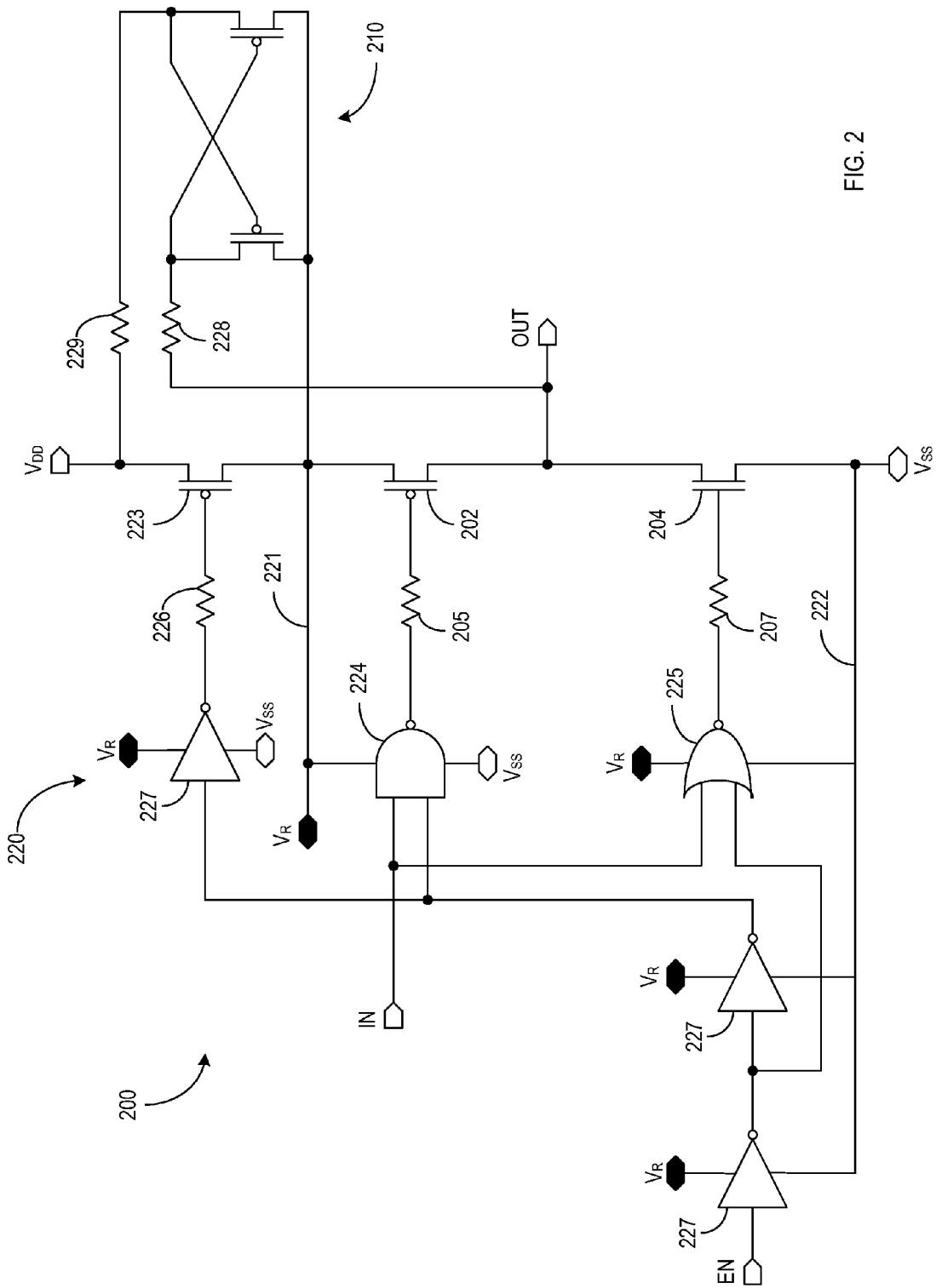
FIG. 2 illustrates generally an example of an I/O buffer circuit configured to provide ESD protection.

FIG. 2 illustrates generally an example of a I/O buffer circuit 200 configured to provide ESD protection. The I/O buffer circuit 200 can include a PMOS transistor 202 and NMOS transistor 204 to drive the output (OUT) of the I/O buffer circuit 200. In certain examples, the I/O buffer circuit 200 can include pre-driver and enable logic 220. In certain examples, the pre-driver logic can receive a signal at an input (IN) and can drive the PMOS transistor 202 and the NMOS transistor 204 to provide a corresponding signal at the output (OUT). In certain examples, enable logic can receive a signal at an enable input (EN) and can override the pre-driver logic to maintain the output (OUT) in a default logic state, such as by coupling the output (OUT) to a voltage ($V_R$) at high logic supply rail 221 or a voltage ($V_{SS}$) at a low logic supply rail 222. In certain examples, the enable logic can include an enable transistor 223 to couple a supply voltage ($V_{DD}$) to the high logic supply rail 221 in a first state and to decouple the supply voltage ($V_{DD}$) from the high logic supply rail 221 in a second state. In an example, the enable logic can drive the PMOS transistor 202 and the NMOS transistor 204 such that the output (OUT) is decoupled from the high logic supply rail 221 and is coupled to the low logic supply rail 222. In certain examples, the pre-driver and enable logic 220 can be intertwined and can include a NAND gate 224 and a NOR gate 225. In an example, ESD can provide a voltage too high for the components of the NAND gate 224 and the NOR gate 225 such that the ESD induced voltage can exceed break down voltages of drain to substrate diode junctions, thus melting portions of the NAND and NOR gates 224, 225. In an example, a current limiter 205, such as a resistor, can be placed between the output of the NAND gate 224 and the gate of the PMOS transistor 202, reducing the ESD induced currents, and preventing damage to the NAND gate 224. In certain example, a current limiter 207, such as a resistor, can be placed between the output of the NOR gate 225 and the gate of the NMOS transistor 204, reducing ESD induced currents, and preventing damage to the NOR gate 225. In certain examples, a current limiter 226, such as a resistor, can be coupled to the gate of the enable transistor 223, reducing the ESD induced currents, and preventing damage to components associated with the enable logic such as one or more inverters 227 or buffers. In certain examples, a current limiter 228, such as a resistor, can be coupled between the output (OUT) and a voltage translator 210 to reduce the probability of ESD events received at the output (OUT) from damaging one or more transistors of the voltage translator 210. In certain examples, a current limiter 229, such as a resistor, can be coupled between the voltage supply (not shown) and the voltage translator 210 to reduce the probability of ESD events received at the or from the voltage supply from damaging one or more transistors of the voltage translator 210. It is understood that an I/O buffer circuit can include additional logic elements such as, but not limited to, buffers, inverters logic gates, etc. without departing from the scope of the present subject matter.

In certain examples, the I/O buffer circuit can nominally operate at about 10 milliamps or more. In some examples, the current limiters can be about 10 ohms and higher. In some examples, the current limiters can be about 100 ohms or higher. In some examples, the current limiters can be about 1000 ohms or higher. In certain examples, the current limiters can include semiconductor resistors.

In an example, an integrated circuit can include the pre-driver for the NMOS transistor, the current limiter coupled to the gate of the NMOS transistor, the NMOS transistor, the pre-driver for the PMOS transistor, the current limiter coupled to the gate of the PMOS transistor, and the PMOS transistor. In some examples, an integrated circuit can further include the enable logic and the associated current limiter. In some examples, an integrated circuit can further include the voltage translator and the associated current limiters.

ADDITIONAL NOTES

In Example 1, a circuit can include an output, a first transistor configured to couple the output to a high logic supply rail, a second transistor configured to couple the output to a low logic supply rail, pre-driver logic configured to drive a gate of the first transistor and a gate of the second transistor, and a first resistor configured to reduce electrostatic discharge (ESD) induced current between the first transistor and the pre-driver logic.

In Example 2, the circuit of Example 1 optionally includes a second resistor configured to reduce second ESD induced current between the second transistor and the pre-driver logic.

In Example 3, the pre-driver logic of any one or more of Examples 1-2 optionally includes an NAND gate configured to receive an enable signal and an input signal and to provide a first control signal to the first transistor.

In Example 4, the pre-driver logic of any one or more of Examples 1-3 optionally includes an NOR gate configured to receive an enable signal and an input signal and to provide a second control signal to the second transistor.

In Example 5, the circuit of any one or more of Examples 1-4 optionally includes a third transistor configured to receive an enable signal, to couple the high logic supply rail to a supply voltage in response to a first state of the enable signal, and to decouple the high logic supply rail from the supply voltage in response to a second state of the enable signal.

In Example 6, the circuit of any one or more of Examples 1-5 optionally includes at least one of a buffer or an inverter coupled to a gate of the third transistor.

In Example 7, the circuit of any one or more of Examples 1-6 optionally includes a third resistor configured to reduce a third electrostatic discharge (ESD) induced current between the first transistor and the at least one of the buffer or the inverter.

in Example 8, the circuit of any one or more of Examples 1-7 optionally includes a translator configured to maintain the high logic supply rail at the higher of a voltage of a voltage supply or a voltage of the output.

In Example 9, the translator of any one or more of Examples 1-8 optionally includes a first translator transistor coupled to the output and the high logic supply rail and a second translator transistor coupled to the voltage supply and the high logic supply rail.

In Example 10, the circuit of any one or more of Examples 1-9 optionally includes a fourth resistor configured to reduce a fourth electrostatic discharge (ESD) induced current between the output and the first translator transistor.

In Example 11, the circuit of any one or more of Examples 1-10 optionally includes a fifth resistor configured to reduce a fifth electrostatic discharge (ESD) induced current between the voltage supply and the second translator transistor.

In Example 12, the first transistor of any one or more of Examples 1-11 optionally includes a p-channel metal oxide semiconductor (PMOS) field-effect transistor.

In Example 13, the second transistor of any one or more of Examples 1-12 optionally includes an n-channel metal oxide semiconductor (NMOS) field-effect transistor.

In Example 14, an apparatus can include an n-channel metal oxide semiconductor field-effect transistor (NMOS) pre-driver, an NMOS transistor, a p-channel metal oxide semiconductor field effect transistor (PMOS) pre-driver, a PMOS transistor, an output between the NMOS transistor source and the PMOS transistor drain, a first current limiter between the NMOS pre-driver and the NMOS transistor gate, and a second current limiter between the PMOS pre-driver and the PMOS transistor gate.

In Example 15, at least one of the first or second current limiters of any one or more of Examples 1-14 optionally includes a semiconductor resistor.

In Example 16, an integrated circuit optionally includes the NMOS pre-driver, the NMOS transistor, the PMOS pre-driver, the PMOS transistor, and the first and second current limiters of any one or more of Examples 1-15.

In Example 17, a method can include receiving an input signal at a pre-driver of an output buffer, coupling an output to a high logic supply rail using a first transistor in response to a first state of the input signal, coupling the output to a low logic supply rail using a second transistor in response to a second state of the input signal, and limiting a first electrostatic discharge (ESD) induced current between a gate of first transistor and the pre-driver using a first current limiter.

In Example 18, the method of any one or more of Examples 1-17 optionally includes limiting a second (ESD) induced current between a gate of second transistor and the pre-driver using a second current limiter.

In Example 19, the method of any one or more of Examples 1-18 optionally includes receiving an enable signal at a third transistor, coupling a voltage supply to the high logic supply rail in response to a first state of the enable signal, and decoupling the voltage supply from the high logic supply rail in response to a second state of the enable signal.

In Example 20, the method of any one or more of Examples 1-19 optionally includes limiting a third ESD induced current of a gate of the third transistor using a third current limiter.

In Example 21, the apparatus of any one or more of Examples 1-16 optionally includes a third current limiter between a power rail and the NMOS pre-driver, and a fourth current limiter between the power rail and the PMOS pre-driver.

Example 22 can include, or can optionally be combined with any portion or combination of any portions of any one or more of Examples 1-21 to include, subject matter that can include means for performing any one or more of the functions of Examples 1-21, or a machine-readable medium including instructions that, when performed by a machine, cause the machine to perform any one or more of the functions of Examples 1-21.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A circuit comprising:
   an output;
   a first transistor configured to couple the output to a high logic supply rail;
   a second transistor configured to couple the output to a low logic supply rail;
   pre-driver logic configured to drive a gate of the first transistor and a gate of the second transistor;
   a first resistor configured to reduce electrostatic discharge (ESD) induced current between the first transistor and the pre-driver logic; and
   wherein an output of the pre-driver logic and the gate of the first transistor are coupled through the first resistor.

2. The circuit of claim 1, including a second resistor configured to reduce second ESD induced current between the second transistor and the pre-driver logic.

3. The circuit of claim 1, wherein the pre-driver logic includes an NAND gate configured to receive an enable signal and an input signal and to provide a first control signal to the first transistor.

4. The circuit of claim 1, wherein the pre-driver logic includes an NOR gate configured to receive an enable signal and an input signal and to provide a second control signal to the second transistor.

5. The circuit of claim 1, including a third transistor configured to receive an enable signal, to couple the high logic supply rail to a supply voltage in response to a first state of the enable signal, and to decouple the high logic supply rail from the supply voltage in response to a second state of the enable signal.

6. The circuit of claim 5, including at least one of a buffer or an inverter coupled to a gate of the third transistor.

7. The circuit of claim 6, including a third resistor configured to reduce a third electrostatic discharge (ESD) induced current between the first transistor and the at least one of the buffer or the inverter.

8. The circuit of claim 1, including a translator configured to maintain the high logic supply rail at the higher of a voltage of a voltage supply or a voltage of the output.

9. The circuit of claim 8, wherein the translator includes:
a first translator transistor coupled to the output and the high logic supply rail; and
a second translator transistor coupled to the voltage supply and the high logic supply rail.

10. The circuit of claim 9, including a fourth resistor configured to reduce a fourth electrostatic discharge (ESD) induced current between the output and the first translator transistor.

11. The circuit of claim 10, including a fifth resistor configured to reduce a fifth electrostatic discharge (ESD) induced current between the voltage supply and the second translator transistor.

12. The circuit of claim 1, wherein the first transistor includes a p-channel metal oxide semiconductor field-effect transistor (PMOS.

13. The circuit of claim 1, wherein the second transistor includes an n-channel metal oxide semiconductor field-effect transistor (NMOS).

14. An apparatus comprising:
an n-channel metal oxide semiconductor field-effect transistor (NMOS) pre-driver;
an NMOS transistor;
a p-channel metal oxide semiconductor field effect transistor (PMOS) pre-driver;
a PMOS transistor;
an output between the NMOS transistor source and the PMOS transistor drain;
a first current limiter between the NMOS pre-driver and the NMOS transistor gate; and
a second current limiter between the PMOS pre-driver and the PMOS transistor gate.

15. The apparatus of claim 14, wherein at least one of the first or second current limiters includes a resistor.

16. The apparatus of claim 14, wherein an integrated circuit includes:
the NMOS pre-driver;
the NMOS transistor;
the PMOS pre-driver;
the PMOS transistor; and
the first and second current limiters.

17. A method comprising:
receiving an input signal at a pre-driver of an output buffer;
coupling an output to a high logic supply rail using a first transistor in response to a first state of the input signal;
coupling the output to a low logic supply rail using a second transistor in response to a second state of the input signal;
limiting a first electrostatic discharge (ESD) induced current between a gate of first transistor and the pre-driver using a first current limiter, the first current limiter having a first end coupled to the gate of the first transistor and a second end coupled to an output of the pre-driver.

18. The method of claim 17, including limiting a second (ESD) induced current between a gate of second transistor and the pre-driver using a second current limiter.

19. The method of claim 17, including:
receiving an enable signal at a third transistor,
coupling a voltage supply to the high logic supply rail in response to a first state of the enable signal; and
decoupling the voltage supply from the high logic supply rail in response to a second state of the enable signal.

20. The method of claim 19, including limiting a third ESD induced current of a gate of the third transistor using a third current limiter.

* * * * *